United States Patent
Blattmann

[11] Patent Number: 5,820,340
[45] Date of Patent: Oct. 13, 1998

[54] PUMP SHAFT TENSION RELEASE DEVICE

[75] Inventor: Urs J. Blattmann, Garibaldi, Canada

[73] Assignee: Toyo Pumps North America Corp., Burnaby, Canada

[21] Appl. No.: 844,985

[22] Filed: Apr. 23, 1997

[51] Int. Cl.[6] .................................................. F01D 25/00
[52] U.S. Cl. ............................. 415/216.1; 415/174.1; 415/229; 416/224 R; 416/204
[58] Field of Search .................. 415/229, 216.1, 415/132, 201, 131, 174.1; 416/244 R, 204 R, 246, 205

[56] References Cited

U.S. PATENT DOCUMENTS

| | | | |
|---|---|---|---|
| 1,772,685 | 8/1930 | Pollak . | |
| 2,141,122 | 12/1938 | Boden | 308/184 |
| 2,173,561 | 9/1939 | Olson | 308/189 |
| 2,228,005 | 1/1941 | Giles | 84/50 |
| 2,321,810 | 6/1943 | Gurley | 103/113 |
| 2,337,832 | 12/1943 | Moul et al. | 308/63 |
| 2,804,358 | 8/1957 | Eriksson | 308/184 |
| 2,862,453 | 12/1958 | Nagle | 103/103 |
| 2,865,299 | 12/1958 | Hornschuch et al. | 103/111 |
| 2,950,082 | 8/1960 | McVeigh | 416/244 R |
| 2,957,425 | 10/1960 | Nagle | 103/103 |
| 3,000,447 | 9/1961 | Baugher | 170/160.43 |
| 3,580,648 | 5/1971 | Zink et al. | 308/207 |
| 3,711,218 | 1/1973 | Kennell et al. | 415/131 |
| 4,869,694 | 9/1989 | McCormick | 403/16 |
| 5,192,142 | 3/1993 | Hyll | 403/16 |
| 5,607,285 | 3/1997 | Eckel | 415/216.1 |

*Primary Examiner*—F. Daniel Lopez
*Assistant Examiner*—Richard Woo
*Attorney, Agent, or Firm*—Seed and Berry LLP

[57] ABSTRACT

A device for releasing tension in a pump shaft is shown and described. An annular elastomeric member is positioned on the circumference of the pump shaft, the elastomeric member having circumferentially spaced holes provided in a surface distal to the shaft. The elastomeric member is confined in an axial direction, and a volume control member is positioned in each of the holes, such that the elastomeric member is also confined in a radial direction. During operation of the pump, the torque on the pump shaft induces a tensile load on the shaft which in turn causes a compression load on the components mounted on the shaft, the compression load being borne by the elastomeric member. After operation of the pump, the volume control members are retracted from the holes, such that the elastomeric member is allowed to compress, thereby unloading the shaft and connection to the pump impeller. The impeller may then be easily unscrewed and removed from the pump shaft.

19 Claims, 5 Drawing Sheets

PUMP SHAFT TENSION RELEASE DEVICE

TECHNICAL FIELD

This invention relates to centrifugal pumps, and more particularly, to a device for releasing tension in a pump shaft.

BACKGROUND OF THE INVENTION

When a pump is operated for a prolonged period of time, the pump shaft is subjected to constant torque input and shock loading. As a result, the threaded connection between the pump shaft and the pump impeller becomes so tight that it is almost impossible to remove the impeller without the aid of mechanical devices.

Currently available devices for enabling the removal of the impeller include collars positioned between the pump shaft and a shaft sleeve which require disassembly and/or physical force to be removed to perform their function of releasing the impeller. These currently available devices have several disadvantages, in that they are typically very difficult, time-consuming and costly to use, and their use may result in damage to surrounding pump components.

Accordingly, there is a need in the art for an improved system for releasing an impeller from its shaft after operation of the pump. The present invention fulfills these needs, and provides further related advantages.

SUMMARY OF THE INVENTION

Briefly, the present invention provides an improved device for releasing the tension in a pump shaft, thereby facilitating the removal of an impeller threadedly engaged on the shaft. In a preferred embodiment, an annular casing is provided on the circumference of the pump shaft, the casing having a plurality of apertures circumferentially spaced around the casing and extending from an outer surface of the casing to an inner region of the casing. A release element having an annular elastomeric member and two annular end caps provided on opposing sides of the elastomeric member is positioned in the inner region of the casing. In a preferred embodiment, the annular elastomeric member is provided with a plurality of holes spaced circumferentially around the member, such that when the release element is positioned in the casing, the holes in the elastomeric member are aligned with the apertures in the casing. A volume control member, such as a screw, is provided in each of the apertures, and is configured to be selectively advanced through the aperture into the hole of the elastomeric member, and retracted from the hole. When the volume control member is seated in the hole of the elastomeric member, the elastomeric member is confined on all sides, namely by the annular end caps, the casing, the volume control member, and the shaft. Therefore, as the pump begins to operate and the shaft rotates, the torque on the shaft induces a tensile load along a length of the shaft which in turn generates a compression load on the annular casing and release element. Because the elastomeric member is confined on all sides, the release element supports the compression load, and the elastomeric member forms a seal.

In an alternative embodiment, for smaller pumps, the annular elastomeric member does not have holes, but rather is confined simply by the advancement of the volume control member into the aperture until the volume control member is in contact with the elastomeric member.

After operation of the pump, the volume control members are retracted from the holes in the elastomeric member, thereby allowing the elastomeric member to be compressed. The compression of the elastomeric member in turn relieves the loads on the threaded connection between the shaft and impeller. The impeller is therefore easily unscrewed and removed from the pump shaft.

DETAILED DESCRIPTION OF THE INVENTION

Figure 1:
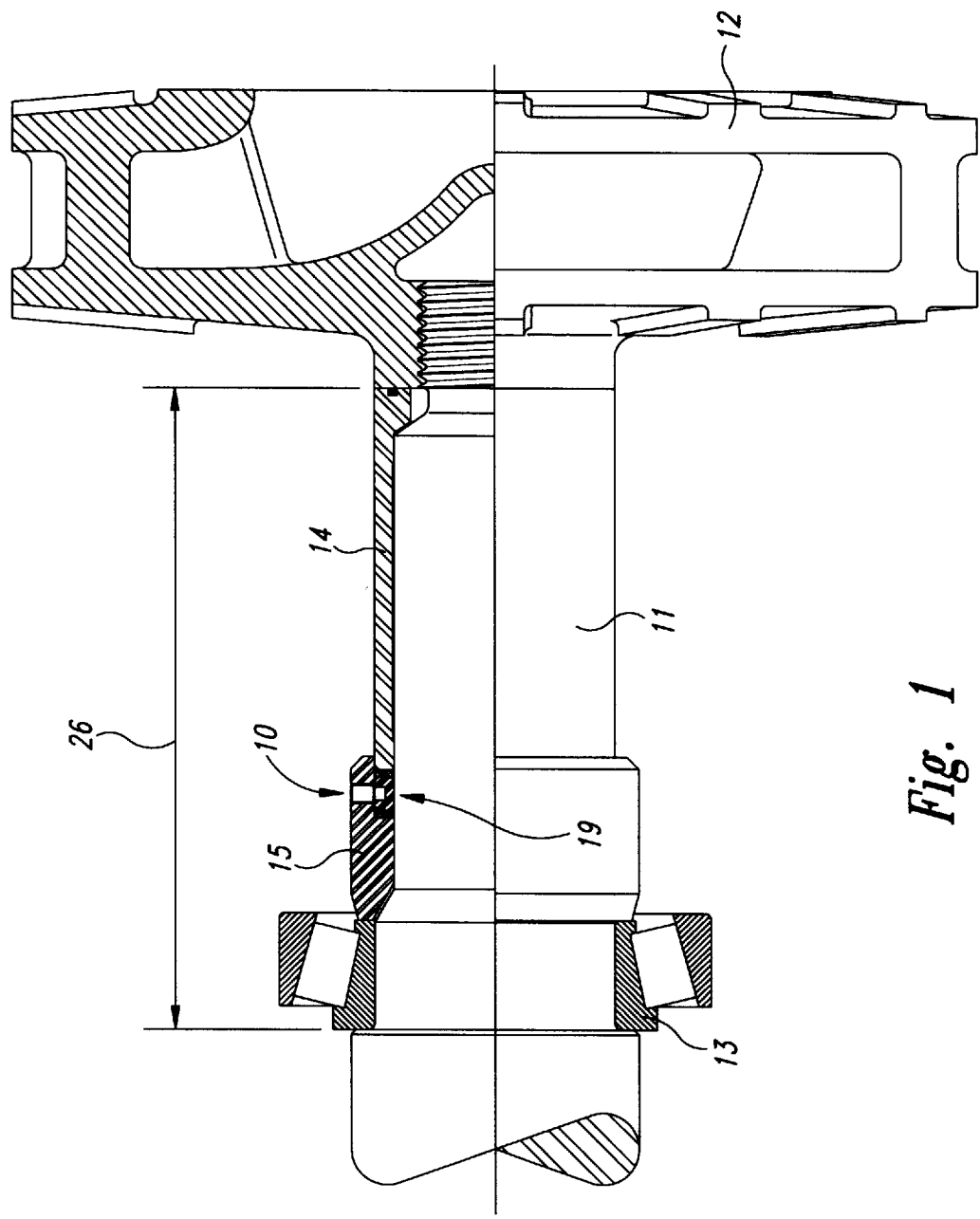
FIG. 1 is a partial cross-sectional elevational view of a device provided in accordance with a preferred embodiment of the present invention, installed on a pump assembly.
Figure 2:
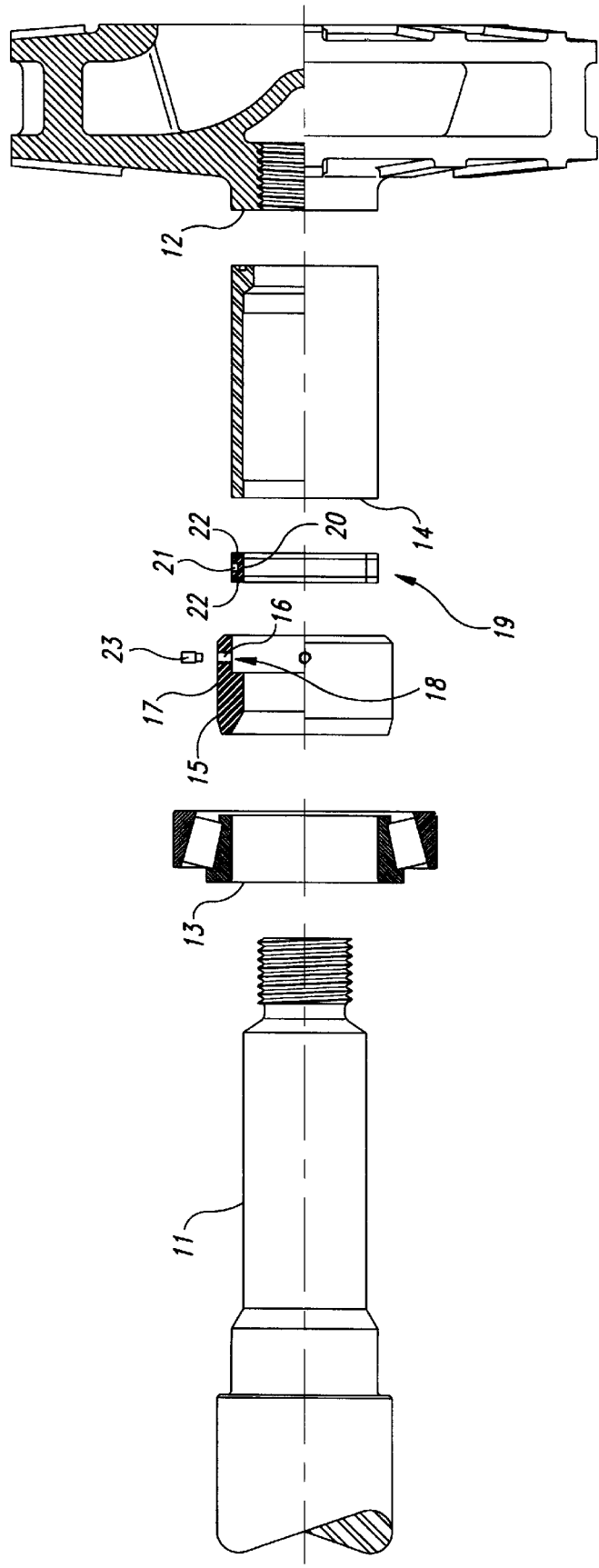
FIG. 2 is an exploded, partial cross-sectional elevational view of the apparatus illustrated in FIG. 1.

An improved device 10 for releasing tension in a pump shaft 11 is provided in accordance with a preferred embodiment of the present invention. As illustrated in FIGS. 1 and 2, an annular casing 15 is provided on the circumference of the pump shaft 11, adjacent bearing ring 13. The casing 15 is provided with a plurality of apertures 16 spaced circumferentially around the casing, the apertures 16 extending from an outer surface 17 of the casing to an inner region 18 of the casing. Although the annular casing 15 may be made of a variety of metals, in a preferred embodiment, it is made of stainless steel.

A release element 19 is seated in the inner region 18 of the casing 15, the release element 19 having an annular elastomeric member 20 enclosed on opposing sides by annular end caps 22. Although the elastomeric member 20 may be made of a variety of materials, in a preferred embodiment, it is made of a fluor-elastomer, such as DuPont® Viton®. Although the annular end caps 22 may also be made of a variety of materials, in a preferred embodiment, they are made of Teflon®. The elastomeric member 20 surrounds shaft 11 and is provided with a plurality of circumferentially spaced holes 21 in surface 27 distal to shaft 11. The release element 19 is seated in the casing 15 such that the holes 21 are aligned with the apertures 16 of the casing. Release element 19 is further positioned by shaft sleeve 14 which extends from the release element 19 to the impeller 12.

A volume control member 23 is provided in each aperture 16, the volume control member 23 being sized and adapted to be advanced into the aperture 16 and hole 21, in the direction indicated by reference arrow 24 in FIG. 3, and to be retracted in the direction illustrated by reference arrow 25 in FIG. 4. It will be understood that the size, number and spacing of the apertures 16, holes 21 and volume control members 23 will be dependent on the size of the pump shaft. In a preferred embodiment, the volume control members 23 are screws.

Figure 3:
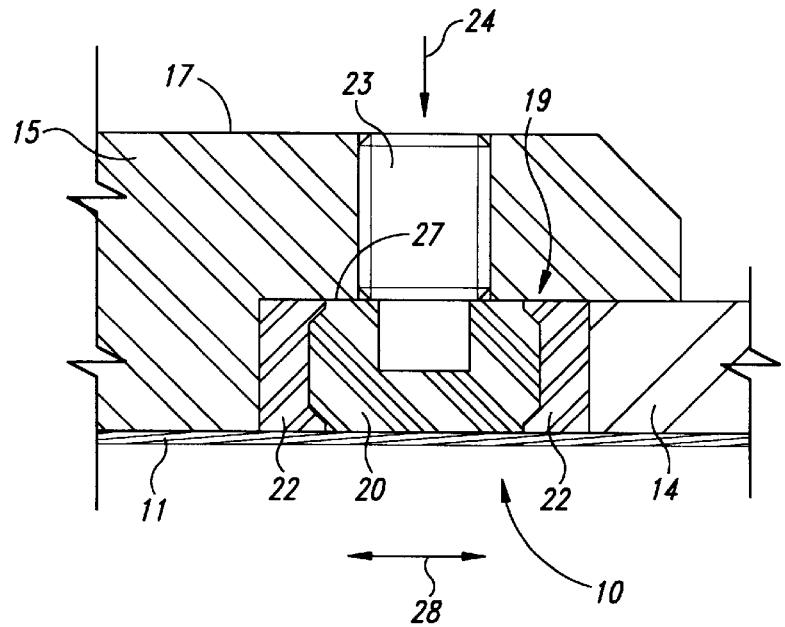
FIG. 3 is an enlarged, cross-sectional elevational view of a device provided in accordance with a preferred embodiment of the present invention, illustrated in a first position.
Figure 4:
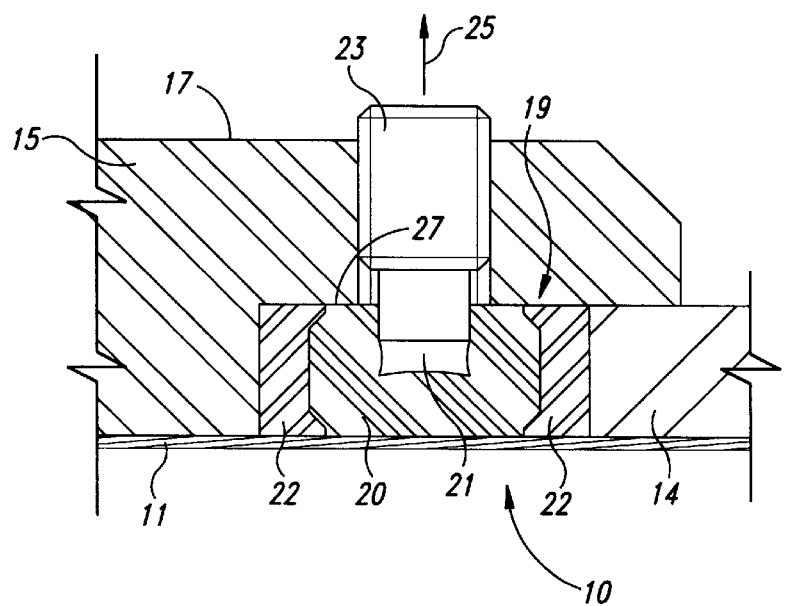
FIG. 4 is an enlarged, cross-sectional elevational view of a device provided in accordance with a preferred embodiment of the present invention, illustrated in a second position.

As best seen in FIG. 3, when the volume control member 23 is seated in the hole 21 of elastomeric member 20, the elastomeric member 20 is confined on all sides. During operation of the pump, the torque on the shaft 11 induces a tensile load along the length 26 of the shaft illustrated in FIG. 1. The magnitude of the load is dependent on the pitch of the connecting thread between the shaft and the impeller. The tensile load on the pump shaft 11 causes an equal and opposing compression load on the bearing ring 13, annular casing 15, release element 19 and shaft sleeve 14. This compression load is supported by the release element 19, which is confined on all sides. As a result, the elastomeric member 20 creates a seal in both the axial direction 28 and a radial direction, thereby preventing liquid and other contaminants from migrating to the interior of the bearing housing.

After operation of the pump, the volume control members 23 are retracted from holes 21. Although the amount of retraction will be determined by feel, in a preferred embodiment, the volume control member is retracted by one half the length of the engagement with aperture 16. As the volume control member 23 is retracted from hole 21, the elastomeric member 20 is no longer confined, and therefore compresses, thereby relieving the loads on the pump shaft and connection with the impeller. The impeller 12 may then be easily unscrewed and removed from the pump shaft 11.

Figure 5:
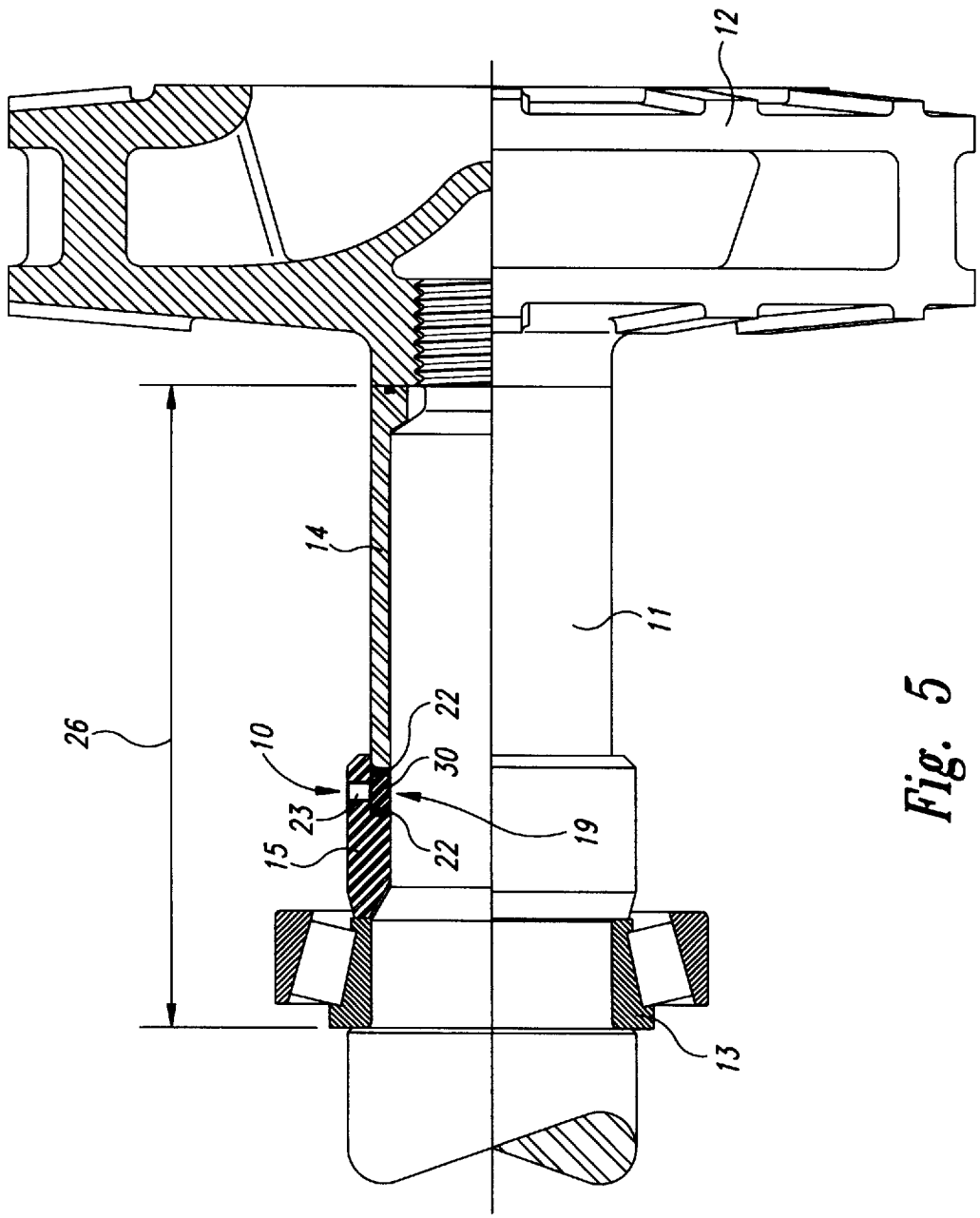
FIG. 5 is a partial cross-sectional elevational view of a device provided in accordance with an alternative embodiment of the present invention, installed on a pump assembly.
Figure 6:
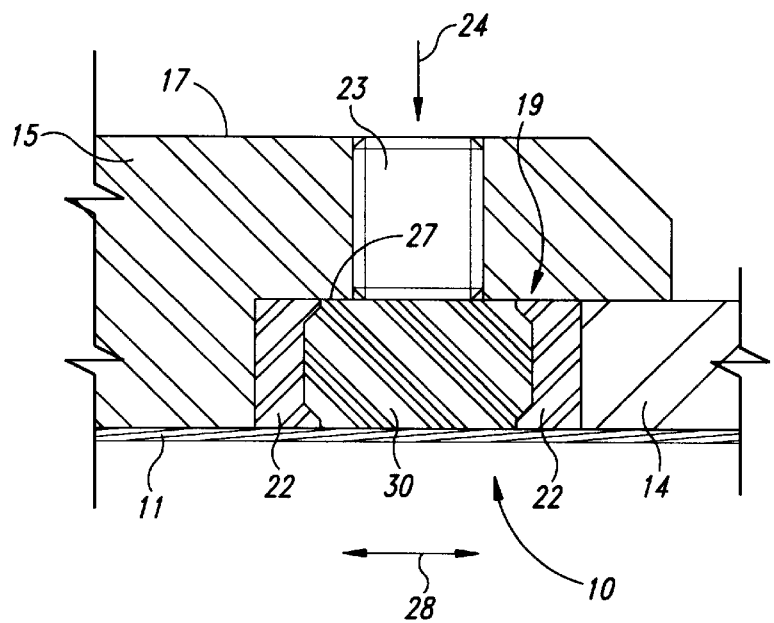
FIG. 6 is an enlarged, cross-sectional elevational view of a device provided in accordance with an alternative embodiment of the present invention, illustrated in a first position.
Figure 7:
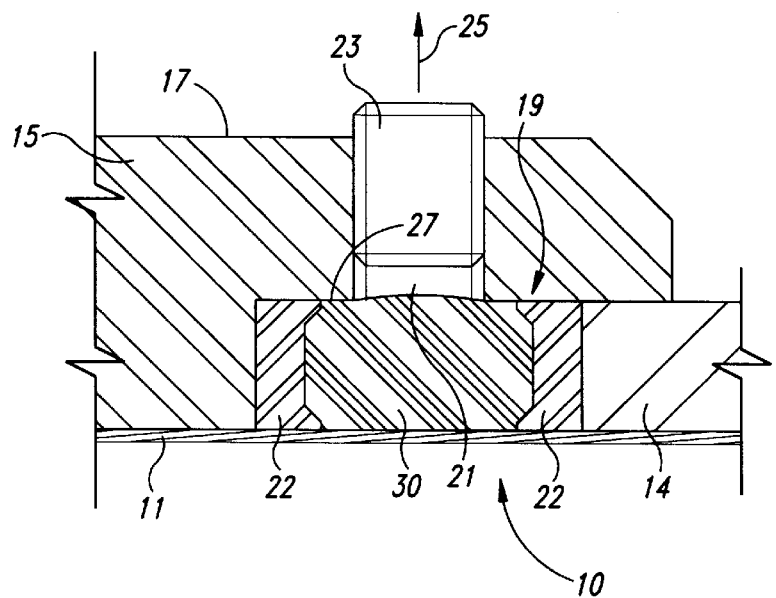
FIG. 7 is an enlarged, cross-sectional elevational view of a device provided in accordance with an alternative embodiment of the present invention, illustrated in a second position.

In an alternative embodiment, for smaller pumps, as illustrated in FIGS. 5–7, the release element 19 is provided with an annular elastomeric member 30, which is confined by the advancement of volume control members 23 into apertures 16. Similar to that described above, when the volume control member 23 is seated against the annual elastomeric member 30, the elastomeric member 30 is confined on all sides, such that the release element 19 supports the compression load generated by the tensile load on the pump shaft 11. The elastomeric member 30 thereby creates a seal in both the axial direction 28 and a radial direction, thereby preventing liquid and other contaminants from migrating to the interior of the bearing housing.

After operation of the pump, the volume control members 23 are retracted from apertures 16 such that the elastomeric member 30 is no longer confined. The elastomeric member 30 is therefore able to compress, thereby relieving the loads on the pump shaft and connection with the impeller.

As seen in FIGS. 1, 3 and 4–7, the release element 19 is completely surrounded and therefore shielded from atmospheric conditions. It is also self-sealing, given the reaction of the elastomeric member to pressure, thereby preventing the migration of contaminants. However, the apertures 16 and volume control members 23 provided therein are exposed to the surrounding atmosphere, thereby making the adjustment device 10 easily accessible.

A device for releasing tension in a pump shaft has been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

I claim:

1. A device for releasing tension in a pump shaft comprising:

an annular casing provided on the pump shaft, the annular casing having a plurality of apertures circumferentially spaced around the casing and extending from an outer surface of the casing to an inner region of the casing;

a release element having an annular elastomeric member provided with a plurality of holes, and two annular end caps provided on opposing sides of the annular elastomeric member, the release element being received by the annular casing such that the holes are aligned with the apertures; and a volume control member provided in each of the apertures, the volume control member being adapted to be advanced into the aperture and the hole, thereby confining the elastomeric member, and to be retracted from the hole, thereby allowing the elastomeric member to be compressed.

2. The device according to claim 1 wherein the volume control member is a screw.

3. The device according to claim 1 wherein the apertures in the casing are exposed to the environment such that the volume control members are easily accessed.

4. The device according to claim 1 wherein the release element is enclosed on all sides such that it is shielded from the atmosphere.

5. The device according to claim 1 wherein the elastomeric member is confined on all sides when the volume control member is advanced into the hole, such that the elastomeric member forms a seal in all directions when subjected to a compression load.

6. A pump assembly comprising:

a pump having an impeller coupled to a pump shaft;

an annular casing provided on the pump shaft, the annular casing having a plurality of apertures circumferentially spaced around the casing and extending from an outer surface of the casing to an inner region of the casing;

a release element having an annular elastomeric member provided with a plurality of holes, and two annular end caps provided on opposing sides of the annular elastomeric member, the release element being received by the annular casing such that the holes are aligned with the apertures; and a volume control member provided in each of the apertures, the volume control member being adapted to be advanced into the aperture and the hole, thereby confining the elastomeric member, and to be retracted from the hole, thereby allowing the elastomeric member to be compressed.

7. A device for releasing tension in a pump shaft comprising:

an annular elastomeric member provided on the circumference of the pump shaft, the elastomeric member being confined in an axial direction and being provided with an aperture in a surface distal to the pump shaft; and a volume control member being sized and adapted to be selectively advanced into and retracted from the aperture, such that when the volume control member is positioned in the aperture, the elastomeric member is confined on all sides and supports a compression load generated by torque on the shaft, the elastomeric member being compressed and relieving a tensile load on the shaft as the volume control member is retracted from the aperture.

8. The device according to claim 7 wherein the elastomeric member is positioned within an annular housing that is provided on the circumference of the pump shaft.

9. The apparatus according to claim 7 wherein the elastomeric member is confined in an axial direction by two annular end caps provided on opposing sides of the elastomeric member.

10. The device according to claim 7 wherein the elastomeric member is confined on all sides when the volume control member is advanced into the aperture, such that the elastomeric member forms a seal in all directions when subjected to a compression load.

11. A device for releasing tension in a pump shaft comprising:

an annular casing provided on the pump shaft, the annular casing having a plurality of apertures circumferentially spaced around the casing and extending from an outer surface of the casing to an inner region of the casing;

a release element having an annular elastomeric member and two annular end caps provided on opposing sides of the annular elastomeric member, the release element being received by the annular casing such that the annular elastomeric member is aligned with the apertures; and a volume control member provided in each of the apertures, the volume control member being adapted to be advanced into the aperture, thereby confining the elastomeric member, and to be retracted from the aperture, thereby allowing the elastomeric member to be compressed.

12. The device according to claim 11 wherein the volume control member is a screw.

13. The device according to claim 11 wherein the apertures in the casing are exposed to the environment such that the volume control members are easily accessed.

14. The device according to claim 11 wherein the release element is enclosed on all sides such that it is shielded from the atmosphere.

15. The device according to claim 11 wherein the elastomeric member is confined on all sides when the volume control member is advanced into the aperture, such that the elastomeric member forms a seal in all directions when subjected to a compression load.

16. A pump assembly comprising:

a pump having an impeller coupled to a pump shaft;

an annular casing provided on the pump shaft, the annular casing having a plurality of apertures circumferentially spaced around the casing and extending from an outer surface of the casing to an inner region of the casing;

a release element having an annular elastomeric member and two annular end caps provided on opposing sides of the annular elastomeric member, the release element being received by the annular casing such that the annular elastomeric member is aligned with the apertures; and a volume control member provided in each of the apertures, the volume control member being adapted to be advanced into the aperture, thereby confining the elastomeric member, and to be retracted from the aperture, thereby allowing the elastomeric member to be compressed.

17. A device for releasing tension in a pump shaft comprising:

an annular elastomeric member provided on the circumference of the pump shaft, the elastomeric member being confined in an axial direction and being aligned with a volume control member that is selectively advanced toward the elastomeric member and away from the elastomeric member, the elastomeric member being confined on all sides when the volume control member is in contact with the elastomeric member, such that the elastomeric member supports a compression load generated by torque on the shaft.

18. The device according to claim 17 wherein the elastomeric member is positioned within an annular housing that is provided on the circumference of the pump shaft.

19. The apparatus according to claim 17 wherein the elastomeric member is confined in an axial direction by two annular end caps provided on opposing sides of the elastomeric member.

* * * * *